United States Patent [19]

Obushenko

[11] Patent Number: 5,679,131
[45] Date of Patent: Oct. 21, 1997

[54] METHOD FOR PRODUCING TITANIUM OXIDE FROM ORE CONCENTRATES

[75] Inventor: Ivan M. Obushenko, St. Paul, Minn.

[73] Assignee: Photran Corporation, Lakeville, Minn.

[21] Appl. No.: 614,658

[22] Filed: Mar. 13, 1996

[51] Int. Cl.$^6$ ............................................. C22B 34/12
[52] U.S. Cl. .................. 75/435; 423/84; 423/610; 75/419
[58] Field of Search .................. 75/435, 419; 423/84, 423/610

[56] References Cited

U.S. PATENT DOCUMENTS 5,378,438  1/1995  Leary ............................................. 423/80

FOREIGN PATENT DOCUMENTS 54-54914  5/1979  Japan .
9404709   3/1994  WIPO ............................................. 423/610

Primary Examiner—Melvyn Andrews
Attorney, Agent, or Firm—R. Russel Austin

[57] ABSTRACT

A method for producing titanium dioxide from an iron-containing titanium ore concentrate includes heating the ore concentrate in the presence of a reducing agent to provide a sintered reaction product including a titanium salt of the alkali metal and metallic iron. The titanium salt of the alkali metal is decomposed by addition of water to provide titanium dioxide. For ilmenite ($FeTiO_3$), preferred alkali metal salts include carbonates, and formates of sodium and potassium. The titanium metal salt so formed is sodium or potassium meta titanate ($K_2TiO_3$ or $Na_2TiO_3$) depending on the alkali metal used. Suitable reducing agents include hydrogen, methane, carbon monoxide, or solid carbon. Metallic iron may be magnetically separated from ground reaction product or from a slurry formed by addition of water to the reaction product, the slurry including the titanium dioxide.

19 Claims, 1 Drawing Sheet

METHOD FOR PRODUCING TITANIUM OXIDE FROM ORE CONCENTRATES

BACKGROUND OF THE INVENTION

The present invention relates in general to producing titanium oxide from titanium ore concentrates. The invention relates in particular to a method for producing titanium oxide from ilmenite ($FeTiO_3$) titanium concentrate, including reducing and reacting the concentrate to provide a mixture of metallic iron and an intermediate titanium containing compound, magnetically separating the metallic iron, from the intermediate titanium containing compound, and water treating the intermediate titanium compound to obtain titanium oxide therefrom.

In selecting a method for processing titanium ore concentrates for the purpose of producing titanium oxide for use as a pigment, or as an intermediate compound for extraction of metallic titanium, certain key factors or indices must be considered. Three important indices are process complexity, process economics, and environmental consequences of the process. A high complexity index, here, meaning the ability of a process to provide metallic iron from the iron-containing ore, in preference to an iron salt.

Prior art processes may be grouped into three types. A first of these involves chlorinating an iron-containing titanium ore concentrate such as ilmenite at a temperature of about one-thousand degrees Centigrade (1000° C.). This is typically done without preliminary separation of iron, a result of which is that an excess of iron chloride is formed, and a high volume of chlorine must be used. This process has a low complexity index, and is expensive, particularly in view of steps which must be taken to insure against environmental hazards of chlorine use.

In a second process, a first step includes melting iron-containing titanium ore concentrate in an electro-arc furnace at a temperature of about 1700° C., thereby producing titanium-containing slag and ungraded pig-iron. This process has a high complexity index, and is relatively economical. However, as titanium-containing slag typically includes impurities including many different metals, a high volume of toxic waste is produced as a by-product.

A third process involves autoclave treatment of an iron-containing titanium ore with hydrochloric acid. This process does not require the high temperature (and consequent energy expenditure) of the first and second processes, and also results in titanium dioxide of a relatively high purity of about 98 percent. Unfortunately it has a low complexity index, and results in the production of toxic iron chloride waste.

It would be desirable to have a new process which did not require an extremely high temperature such as the 1700° C. of the second process. It would also be desirable to have a process which provided the high purity titanium dioxide of the process. It is particularly desirable that whatever new process is devised, it should have a high complexity index and should not produce volumes of toxic waste.

SUMMARY OF THE INVENTION

The present invention is directed to a method for producing titanium dioxide from iron-containing titanium ore. The invention is directed in particular to a method whereby iron from the iron-containing ore is released from the ore in an easily separable metallic state.

In one particular aspect, the method includes reacting, at an elevated temperature, the iron-containing titanium ore with one or more reducing agents and one or more salts of an alkali metal. This reaction provides a sintered reaction product including a titanium salt of the alkali metal and metallic iron.

In another aspect of the present invention, titanium oxide is produced from the reaction product by decomposing the alkali metal titanium salt of the reaction product with water or a weak acid thereby providing a mixture of insoluble titanium oxide and a soluble by-product or by-products in solution. Certain of these are recoverable or recombinable as useful products. Titanium dioxide may be separated from the mixture by decantation or filtration. Preferably, but not necessarily, the water treatment or weak acid decomposition performed after the sintered reaction has been ground into a granular or powder form.

The iron may be separated from the sintered reaction product after water or weak acid treatment thereof without grinding; while both grinding and water treatment are taking place; after the grinding is completed but before hydration; or, after first grinding without treatment, while treatment is taking place.

The one or more reducing agents are preferably selected from the group of reducing agents consisting of carbon (C), carbon monoxide (CO), hydrogen (H), and methane ($CH_4$). The one or more alkali metal salts are preferably selected from the group of alkali metal salts consisting of sodium carbonate ($Na_2CO_3$), sodium hydrogen carbonate ($NaHCO_3$), potassium carbonate ($K_2CO_3$), potassium sodium carbonate ($KNaCO_3$), potassium hydrogen carbonate ($KHCO_3$), sodium formate ($NaHCOO$), potassium formate ($KHCOO$), and crystalline hydrates of any thereof.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DETAILED DESCRIPTION OF THE INVENTION

Figure 1:
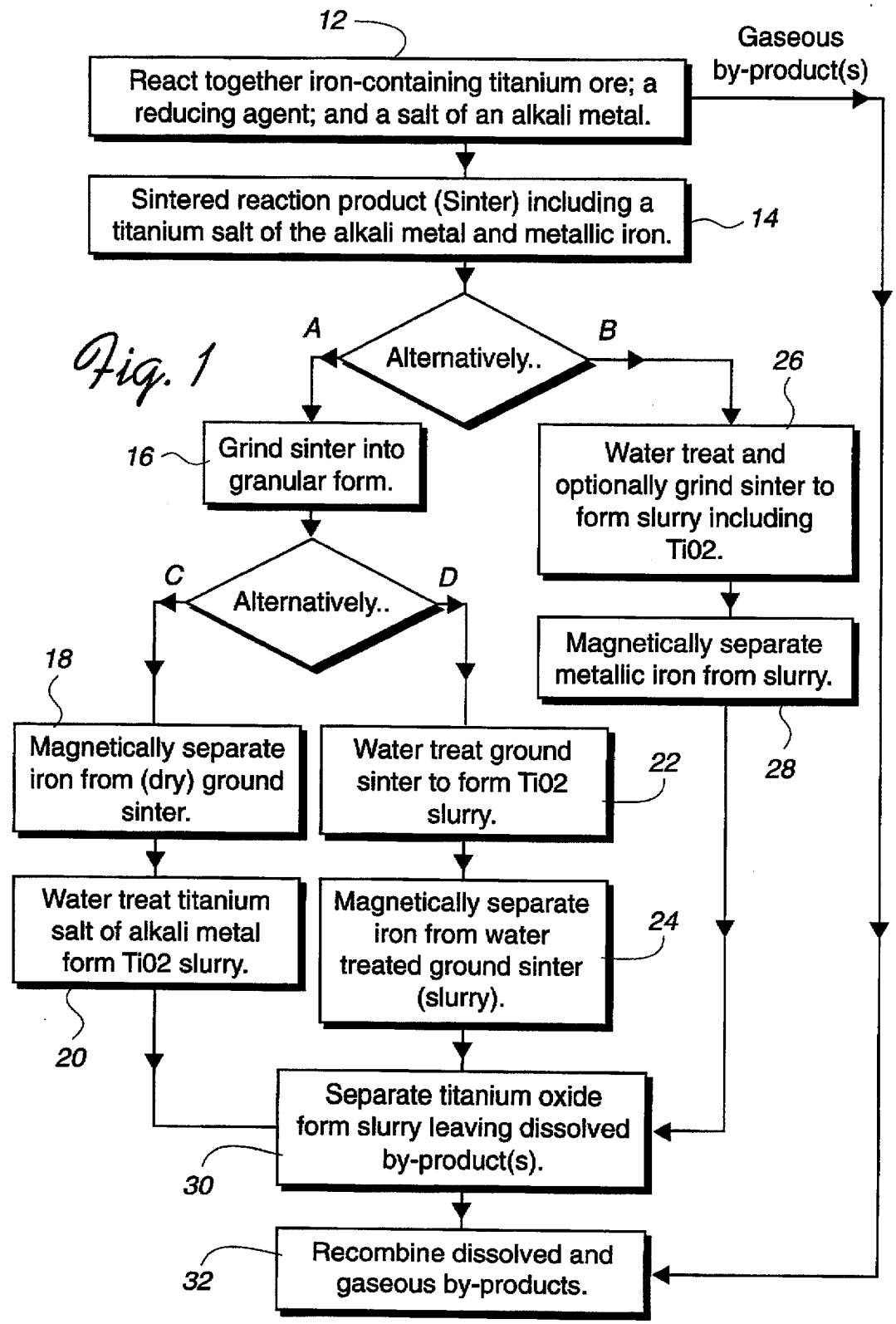
FIG. 1 is a flow chart schematically illustrating alternative step sequences for producing titanium oxide from iron-containing titanium ore in accordance with the present invention.

Referring now to FIG. 1 the method of the present invention will be described with reference to a preferred reagents and chemical reactions. Regarding reagents for reacting with iron-containing titanium ore, a preferred reducing agent is carbon, and a preferred alkali metal salt is sodium carbonate or soda ($Na_2CO_3$). The carbon is preferably in the form of graphite or coke powder.

The titanium ore, for example ilmenite is reacted with the soda and carbon at a temperature, preferably between about 900° C. and 1150° C. (box 12), and most preferably between about 950° C. and 1150° C., to produce a reaction product including metallic iron (Fe), a titanium salt of sodium, sodium meta titanate, ($Na_2TiO_3$), and gaseous by-products carbon monoxide (CO) and carbon dioxide ($CO_2$) (box 14) according to the reaction:

$$FeTiO_3 + Na_2CO_3 \rightarrow Fe + Na_2TiO_3 + CO + CO_2 \tag{1}$$

One preferred temperature range for reaction (1) is between about 1000° C. and 1050° C., because in this range the carbon reducing agent causes the Fe to occur in a granular size between about 0.2 and 0.5 millimeters (mm). Iron can be formed at a temperature lower than 950° C. if a gaseous reducing agent is substituted for carbon, but a temperature between about 900° C. and 950° C. or greater is required. At a temperature greater than 1050° C. the probability that sodium oxide ($Na_2O$) in vapor form will be liberated from the $Na_2CO_3$ greatly increases. Such liberation of $Na_2O$ is undesirable as it reduces sodium available for forming the $Na_2TiO_3$. The reaction product of box 14, including the Fe and $Na_2TiO_3$ is usually in sintered form, and is referred to alternatively hereinafter as the sinter.

The next important steps in the method of the present invention are separation of iron, and water treatment of the titanium salt of the alkali metal. A preferable preliminary step is to grind the sinter into a granular or powder form. Water treatment of the $Na_2TiO_3$ may take place while the sinter is being ground or after the sinter is ground. The method may proceed on any of three paths shown in FIG. 1. In path A the sinter is first ground in an essentially dry state (box 16). Following path C, the iron is then separated from the ground sinter (box 18) such that what remains is essentially $Na_2TiO_3$ (there may be some impurities). Next (box 20) the $Na_2TiO_3$ is decomposed by water treatment, providing what might be described as a slurry containing solid (precipitated) titanium dioxide and by-products of the treatment (and impurities) in solution. Water treatment of the $Na_2TiO_3$ can be defined by the following reaction:

$$Na_2TiO_3 + H_2O \rightarrow 2NaOH + TiO_2\downarrow \qquad (2)$$

NaOH, of course, is water soluble.

In alternative path, D, the $Na_2TiO_3$ in the ground sinter is water treated while it is still in the sinter, together with the Fe (box 22). The iron is then separated from the resulting slurry (box 24). In another alternative path, B, water treatment of the $Na_2TiO_3$ takes place while the sinter is being ground (box 26). Next, iron is separated from the resulting slurry (box 28).

Whatever path is followed, a result is that a slurry is formed (boxes 20, 24 and 28) which precipitated (solid) titanium oxide and soluble by-products and impurities in solution. A common next step (box 30) in each case is separation of the titanium oxide from the slurry by filtration or decantation (settling). Typically, after the titanium oxide is separated, it is dried (this step not shown in FIG. 1). It should be noted here that it is possible to follow path B without a grinding procedure in step 26, i.e water treating unground sinter, although it would probably be slower than would be the case if the sinter were also ground.

One advantageous aspect of the method of the present invention is that reagents used therein can be regenerated, by combining gaseous by-products of the reduction and titanium salt forming step with dissolved products of the water treatment or decomposition of the titanium salt step. For example the NaOH formed in the reaction of equation (2) can be combined with $CO_2$ formed in the reaction of equation (1) according to the reaction:

$$2NaOH + CO_2 \rightarrow Na_2CO_3 + H_2O \qquad (3)$$

NaOH may be combined with CO under pressure to form NaHCOO according to the reaction:

$$NaOH + CO \rightarrow NaHCOO \qquad (4)$$

NaHCOO, as discussed above, is also useful as an alkali metal salt in the initial reduction and salt forming step of the method of the present invention.

While solid carbon is a preferred reducing agent in the method of the present invention, it is possible to use gaseous reducing agents such as $H_2$, $CH_4$ and CO to provide Fe and $Na_2TiO_3$ from $FeTiO_3$ according to the following reactions, respectively

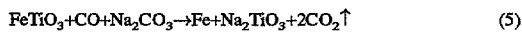

$$FeTiO_3 + CO + Na_2CO_3 \rightarrow Fe + Na_2TiO_3 + 2CO_2\uparrow \qquad (5)$$

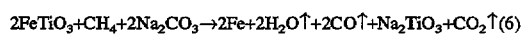

$$2FeTiO_3 + CH_4 + 2Na_2CO_3 \rightarrow 2Fe + 2H_2O\uparrow + 2CO\uparrow + Na_2TiO_3 + CO_2\uparrow \qquad (6)$$

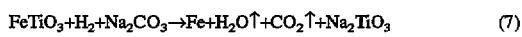

$$FeTiO_3 + H_2 + Na_2CO_3 \rightarrow Fe + H_2O\uparrow + CO_2\uparrow + Na_2TiO_3 \qquad (7)$$

In addition to above-discussed $Na_2CO_3$, other alkali metal salts may be useful in the present invention. For example $NaHCO_3$ and NaHCOO. In the case of $NaHCO_3$, at above about 150° C. (at the sintering temperature) the following reaction takes place:

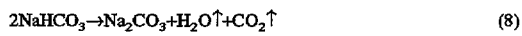

$$2NaHCO_3 \rightarrow Na_2CO_3 + H_2O\uparrow + CO_2\uparrow \qquad (8)$$

$Na_2CO_3$ having been formed, the reaction of equation (1) proceeds.

Similarly, at the sintering temperature, NaHCOO decomposes according to the reaction:

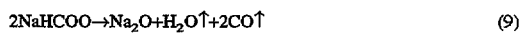

$$2NaHCOO \rightarrow Na_2O + H_2O\uparrow + 2CO\uparrow \qquad (9)$$

whereupon the following reaction proceeds:

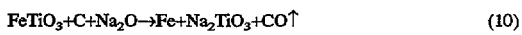

$$FeTiO_3 + C + Na_2O \rightarrow Fe + Na_2TiO_3 + CO\uparrow \qquad (10)$$

Those familiar with the art to which the present invention pertains will recognize that while reactions involving salts of the alkali metal sodium have been presented above, the same salts of the metal potassium (K) could be substituted in any of the reactions. Reaction products would of course include $K_2TiO_3$ and KOH. Explicit presentation of reactions similar reactions with potassium salts is not provided herein to avoid unnecessary repetition. It should also be noted that mixtures of above discussed salts, and of reducing agents, may be employed in the method of the present invention.

The method of the present invention is capable of producing titanium oxide of a relatively high purity of about 98% or better. One reason for this is that at the sintering temperature of about 1000° C. it is possible to form water soluble salts from frequently found impurities in titanium ore, for example, alumina ($Al_2O_3$) and silica ($SiO_2$), by reaction with the alkali metal salt. Such reactions are exemplified as follows:

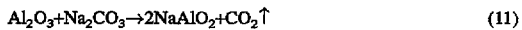

$$Al_2O_3 + Na_2CO_3 \rightarrow 2NaAlO_2 + CO_2\uparrow \qquad (11)$$

$$SiO_2 + Na_2CO_3 \rightarrow Na_2SiO_3 + CO_2\uparrow \qquad (12)$$

Both $NaAlO_2$ and $Na_2SiO_3$ being water soluble, they remain in solution in the slurry and are thus easily separated from the titanium oxide.

Before proceeding with a description of specific practical examples of carrying out the method of the present invention, the following should be noted. In the mixture of alkali metal salt, reducing agent, and titanium ore concentrate, it is important that the proportion of alkali metal salt be at lest sufficient that all titanium in the ore concentrate can be converted into the water-decomposable titanium salt of the alkali metal. When a solid reducing agent such as carbon, is employed in the mixture, heating of the mixture is preferably carried out in an inert atmosphere, for example, in argon (Ar) or nitrogen (N). Preferably, reducing agent is present in the mixture in at least sufficient proportion that all iron compounds in the ore concentrate are reduced to metallic iron. This proportion may be estimated from the reactions:

$$FeO + C \rightarrow Fe + CO \qquad (13)$$

and $$Fe_2O_3 + 3C \rightarrow 2Fe + 3CO \qquad (14)$$

which indicate that the molar ratio of carbon to iron in the mixture should preferably be at least 1:1, and most preferably should be at least 3:2.

If the above guidelines are followed, particularly concerning providing an adequate proportion of alkali metal salt. The titanium salt (titanate) of the alkali metal formed will be a the meta titanate indicated in the above-discussed reactions which as discussed above is easily decomposable by addition of water. If less than an optimum proportion of alkali metal salt is provided titanates in addition to the meta titanate may be formed, these other titanates being less easily decomposed in water alone. I this case an aqeous weak solution of an acid such as sulfuric acid may be substituted for water. This will accelerate decomposition of any titanates which are not easily decomposed by water alone.

The titanium dioxide production method of the present invention has been described above with reference to specific chemical reactions exemplifying important aspects of the method. Set forth below are results of practical examples of embodiments of the method carried out on a laboratory scale.

EXAMPLE 1

One-hundred grams (100 g) of ilmenite ($FeTiO_3$) concentrate containing about 50.3% by mass of $TiO_2$ was ground to a particle size of about 0.2 millimeters (mm) and mixed with 72 g of $Na_2CO_3$ and 10 g of coke powder (carbon) each ground to about the same particle size. The mixture was placed in a ceramic crucible and heated (sintered) in a tube furnace, in flowing inert gas at a rate of about 150 millilters/ minute (ml/min) for 30 minutes. The sinter was then ground and metallic iron was removed from the ground sinter by magnetic separation. The remainder of the sinter was then treated with 300 milliliters (ml) of distilled water by agitating the sinter in the distilled water. This formed a slurry including precipitated titanium oxide and sodium hydroxide (and impurities) in solution. Precipitated titanium dioxide was separated from the solution by settling and decantation. The separated titanium oxide was washed in 100 ml of distilled water and again separated by settling and decantation. The solution was regenerated into $Na_2CO_3$ as discussed above. The titanium oxide obtained in the above example was analyzed and found to be about 99% pure. It included the following impurity fractions expressed in percentage by mass: 0.41 $Al_2O_3$, 0.10 $SiO_2$, 0.05 FeO, 0.09 $V_2O_3$, 0.0014 $Cr_2O_3$, 0.015 MnO, and others. The example yielded 49.7 g of titanium oxide, i.e., a yield of 99.4% of that available in the original ilmenite concentrate.

EXAMPLE 2

One-hundred grams of ilmenite concentrate containing about 50.3% by mass of $TiO_2$ was ground to a particle size of about 0.2 mm and mixed with 72 g of $Na_2CO_3$ ground to about the same particle size. The mixture was placed in a ceramic crucible and heated in a tube furnace, in flowing natural gas (methane-$CH_4$), at a temperature of 1000° C. for 90 minutes. Methane flow rate was maintained at about 400 ml/min during heating. The sinter was then ground and metallic iron was removed from the ground sinter by magnetic separation. The remainder of the sinter was then treated as described in Example 1. The titanium oxide obtained in this example was analyzed and found to be about 98.8% pure. It included the following impurity fractions expressed in percentage by mass: 0.37 $Al_2O_3$, 0.09 $SiO_2$, 0.17 FeO, 0.13 $V_2O_3$, 0.02 $Cr_2O_3$, 0.29 MnO, and others. The example yielded 49.5 g of titanium oxide, i.e., a yield of 99% of that available in the original ilmenite concentrate.

EXAMPLE 3

One-hundred grams of ilmenite concentrate containing about 50.3% by mass of $TiO_2$ was ground to a particle size of about 0.2 mm and mixed with 98 g of $Na_2CO_3 \cdot 10H_2O$ and 93 g of NaHCOO each ground to about the same particle size. The mixture was placed in a ceramic crucible and heated in a tube furnace, in flowing hydrogen, at a temperature of 950° C. for 60 minutes. Hydrogen flow rate was maintained at about 400 ml/min during heating. The sinter was treated by water to form a pulp or slurry containing Fe powder, $TiO_2$ powder, and an aqueous solution of NaOH including fractions of $NaAlO_2$ and $Na_2SiO_3$ in solution. The slurry was treated by magnetic separation to remove iron therefrom. Titanium oxide was separated from the remaining solution as described in Example 1. The titanium oxide obtained in this example was analyzed and found to be greater than 98% pure. It included the following impurity fractions expressed in percentage by mass: 0.51 $Al_2O_3$, 0.26 $SiO_2$, 0.06 FeO, 0.04 $V_2O_3$, 0.027 $Cr_2O_3$, and 0.31 MnO, with other impurities to The example yielded 49.2 g of titanium oxide, i.e., a yield of 98.4% of that available in the original ilmenite concentrate.

EXAMPLE 4

This example is offered, not to illustrate a preferred embodiment of the method of the present invention, but to demonstrate a result of including an insufficient ratio of alkali metal salt in the titanium ore concentrate mixture. Where not otherwise stated, operational procedure of example 1 was followed. One-hundred grams of ilmenite concentrate containing about 50.3% by mass of $TiO_2$ was ground to a particle size of about 0.2 mm and mixed with 85 g of $K_2CO_3$ and 10 g of coke powder each ground to about the same particle size. According to above discussed guidelines, at least 86.9 grams of $K_2CO_3$ would be necessary to convert all FeTiO3 to $K_2TiO_3$, while 8.2 g of coke powder would have been sufficient to reduce all iron in the $FeTiO_3$ into a metallic state. The mixture was placed in a ceramic crucible and heated in a tube furnace, in flowing argon, at a temperature of 1150° C. for 60 minutes. Argon flow rate was maintained at about 400 ml/min.

The titanium oxide obtained in this example was analyzed and found to be only 91.6% pure. It included the following impurity fractions expressed in percentage by mass: 1.8 $Al_2O_3$, 2.5 $SiO_2$, 3.7 FeO, 0.07 $V_2O_3$, 0.017 $Cr_2O_3$, 0.28 MnO, and others. The example yielded 49.6 g of titanium oxide, i.e., a yield of 99.2% of that available in the original ilmenite concentrate.

In summary, a method for recovering titanium oxide from an iron containing titanium ore concentrate is described above. The method may be employed for producing titanium oxide as an intermediate step in manufacturing either a pigment, metallic titanium, or valuable titanium salts by any well known process for doing so. The method is capable of providing a high recovery yield, for example greater than 99% together with a recovered titanium oxide purity of greater than 98% and as high as 99%. A particularly attractive aspect of the method of the present invention is that gaseous by-products formed in a first step of the method can be combined with water soluble by-products produced in later steps to recover reagents used in the method and thereby significantly reduce if not eliminate production of environmentally unfriendly by-products and the cost of containing or disposing of such by-products.

The present invention has been described and depicted in terms of a preferred and other embodiments. The invention is not limited, however, to those embodiments described and depicted. Rather, the invention is limited only by the claims appended hereto.

What is claimed is:

1. A method of extracting titanium from an iron-containing titanium ore, comprising the steps of:
   (a) heating the iron-containing titanium ore at a temperature between about 950 and 1150 degrees Centigrade with a reducing agent and a salt of an alkali metal, thereby forming a reaction product including iron in metallic form and at least one titanate of said alkali metal;
   (b) decomposing said at least one titanate of said alkali metal by addition of water thereto, thereby forming a slurry including precipitated solid titanium oxide; and
   (c) separating said titanium oxide from said slurry.

2. The method of claim 1, wherein said reaction product is in sintered form and the sintered reaction product is ground to a granular form before executing step (b).

3. The method of claim 2, further including the step of (d) separating said metallic iron from said ground sintered reaction product prior to executing step (b).

4. The method of claim 2, wherein said slurry also includes said metallic iron, and further including the step of (d) separating said metallic iron from said slurry after executing step (b).

5. The method of claim 1, wherein said reaction product is in sintered form and said sintered reaction product is ground to a granular form while executing step (b).

6. The method of claim 5, wherein said slurry also includes said metallic iron, and further including the step of (d) separating said metallic iron from said slurry after executing step (b).

7. The method of claim 1 wherein step (b) is accomplished by water treating said sintered reaction product, and said slurry includes the metallic iron.

8. The method of claim 7 further including the step of (d) separating said metallic iron from said slurry.

9. The method of claim 1, wherein in step (a) at least one gaseous by-product is formed, and the slurry of step (b) also includes a hydroxide of said alkali metal, and further including the step of (e) reacting said gaseous by-product with said hydroxide of said alkali metal.

10. The method of claim 1, wherein said reducing agent is solid carbon and step (a) is carried out in an inert gas atmosphere.

11. The method of claim 1, wherein said reducing agent is a gas and step (a) is carried out by heating a mixture of said iron-containing titanium ore and said salt of said alkali metal in said reducing agent gas.

12. The method of claim 1 wherein said iron-containing titanium ore is $FeTiO_3$, and said alkali salt of said alkali metal is selected from the Group consisting of $Na_2CO3$, $NaHCO_3$, $K_2CO_3$, $KNaCO_3$, $KHCO_3$, $NaHCOO$, $KHCOO$, and crystalline hydrates of any thereof.

13. The method of claim 12 wherein said at least one titanate of said alkali metal is one of $Na_2TiO_3$ and $K_2TiO_3$.

14. A method of producing titanium oxide from $FeTiO_3$, comprising the steps of:
   (a) heating the $FeTiO_3$ at a temperature between about 950 and 1150 degrees Centigrade with at a reducing agent selected from the group consisting of $H_2$, $CH_4$, CO, and C, and at least one of potassium or sodium carbonate, potassium or sodium hydrogen carbonate, potassium or sodium formate, and their crystalline hydrates, thereby forming a sintered reaction product including one or both of $K_2TiO_3$ and $Na_2TiO_3$ and metallic Fe;
   (b) by addition of $H_2O$ decomposing said $K_2TiO_3$ or $Na_2TiO_3$ thereby forming a slurry including precipitated $TiO_2$, and a solution including NaOH and KOH; and
   (c) separating said $TiO_2$ from said solution.

15. The method of claim 14, further including, prior to step (b), the step of (d) grinding said sintered reaction product into granular form and magnetically separating said metallic Fe therefrom.

16. The method of claim 14, further including grinding said reaction product into granular form while carrying out step (b).

17. The method of claim 16 further including, after carrying out step (b) the step of (d) magnetically separating said metallic Fe from said slurry.

18. The method of claim 14, further comprising, after step (b), the step of (d) magnetically separating said metallic Fe from said slurry.

19. The method of claim 14, wherein said reducing agent is carbon, and step (a) is carried out in an inert gas.

* * * * *